United States Patent

Fogg et al.

(10) Patent No.: US 6,321,242 B1
(45) Date of Patent: Nov. 20, 2001

(54) RE-LINKING TECHNOLOGY FOR A MOVING WEB SITE

(75) Inventors: B J Fogg, Stanford; Jakob Nielsen, Atherton, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/019,801

(22) Filed: Feb. 6, 1998

(51) Int. Cl.[7] ............................ G06F 17/30; G06F 17/24; G06F 15/173
(52) U.S. Cl. ........................ 707/513; 707/10; 709/223; 709/224
(58) Field of Search ...................... 707/501, 513, 707/104, 10; 709/218, 203, 224, 223, 225, 245; 345/335

(56) References Cited

U.S. PATENT DOCUMENTS

| | | | |
|---|---|---|---|
| 5,708,825 | * 1/1998 | Sotomayor | 707/501 |
| 5,751,956 | * 5/1998 | Kirsch | 709/203 |
| 5,761,683 | * 6/1998 | Logan et al. | 707/513 |
| 5,794,257 | * 8/1998 | Liu et al. | 707/501 |
| 5,870,559 | * 2/1999 | Leshem et al. | 709/224 |
| 5,892,919 | * 4/1999 | Nielsen | 709/228 |
| 5,895,471 | * 4/1999 | King et al. | 707/104 |
| 5,898,836 | * 4/1999 | Freivald et al. | 709/218 |
| 5,958,008 | * 9/1999 | Pogrebisky et al. | 709/223 |
| 5,963,964 | * 10/1999 | Nielsen | 707/501 |
| 5,978,842 | * 11/1999 | Noble et al. | 709/218 |
| 5,983,245 | * 11/1999 | Newman et al. | 707/513 |
| 5,995,099 | * 11/1999 | Horstmann | 345/335 |
| 6,021,435 | * 2/2000 | Nielsen | 709/224 |
| 6,029,175 | * 2/2000 | Chow et al. | 707/104 |
| 6,041,360 | * 3/2000 | Himmel et al. | 709/245 |
| 6,049,799 | * 4/2000 | Mangat et al. | 707/10 |
| 6,144,962 | * 11/2000 | Weinberg et al. | 707/10 |

OTHER PUBLICATIONS

InfoLink 1.6 Freeware (link–checker software application), BiggByte Software, Inc.—screenshots including help screens, pp. 1–14, Jan. 1997.*

Pritchard, John, Efficient HyperLink Maintenance for HTTP, Columbia University–Computer Science, Nov. 21, 1996, pp. 1–9, downloaded from URL: <http://www.syntelos.com/john/draft–pritchard–http–links–OO.html>, download date: Jun. 21, 2001.*

* cited by examiner

Primary Examiner—Stephen S. Hong
Assistant Examiner—William L. Bashore
(74) Attorney, Agent, or Firm—McDermott, Will & Emery

(57) ABSTRACT

Techniques are discussed whereby hyperlinks that exist in an on-line document can be automatically updated (re-linked) when the location of the document to which a link points changes. In one embodiment, the administrator of the on-line document is notified by E-mail when a link destination pointed to by that document has changed. Comparison of the old document content to the new content, if any, is used to facilitate a determination whether to automatically re-link or remove the appropriate hyperlink. In alternate embodiments, receiving sites or trusted third parties are authorized to update links to documents on the receiving site contained in documents on a feeding site.

4 Claims, 18 Drawing Sheets

| RECEIVING SITE DOCUMENT URL | | | FEEDING SITE DOCUMENT URL | | |
|---|---|---|---|---|---|
| | | | | | |

FIG. 3B

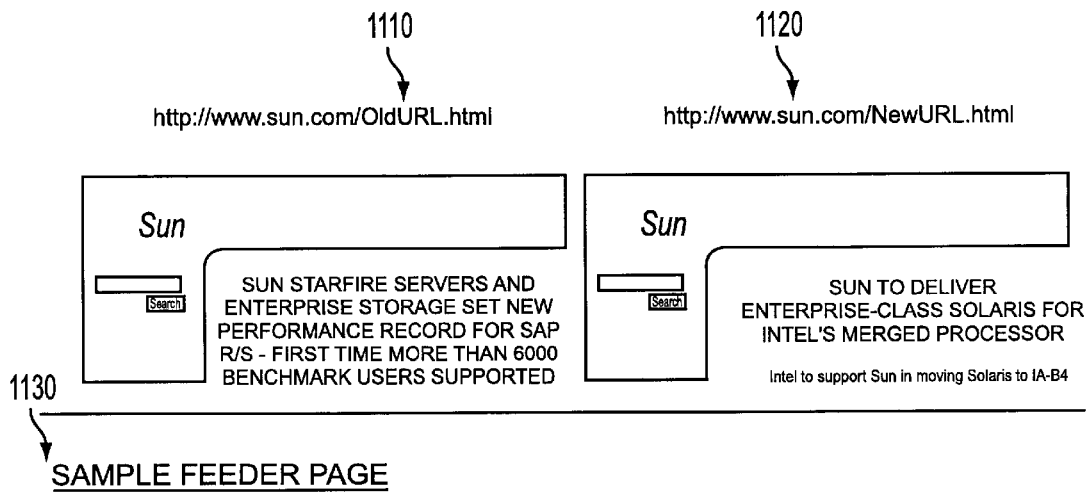

SAMPLE FEEDER PAGE

With world headquarters in Palo Alto, California, Sun Microsystems, Inc. has been described as "the last standing, fully integrated computing company adding its own value at the chip, OS and systems level." (John Doerr, Kleiner Perkins, quoted in Fortune, October 13, 1997).

In an industry characterized by red ink and fierce competition, Sun has averaged 15-20 percent growth over the last several years and has one of the strongest balance sheets in the industry, with nearly $1 billion cash in the bank. Already the world leader in workstation sales (with 35% in revenues and 39% in unit sales, per Dataquest), Sun is successfully transforming itself into an enterprise computing firm focused on global network computing.

Link to Sun's Press Release Page

If you have additional questions about Sun not addressed in this area, try the "Search Sun" tool located in the top left corner of your browser window--just type in a keyword and hit "Search", or, feel free to contact us at 650-786-7737.

*The link identified by the anchor*

Link to Sun's Press Release Page

Has Changed:

From - http://www.sun.com/oldURL.html

To - http://www.sun.com/newURL.html

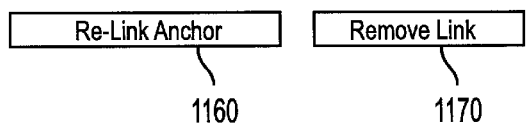

FIG. 11

RE-LINKING TECHNOLOGY FOR A MOVING WEB SITE

BACKGROUND OF THE INVENTION

1. Field of the Invention

The invention relates to computer networks such as the World Wide Web and, more particularly, to the correction of information links, such as hypertext links, which point to a network document which has been relocated in information space.

2. Description of Related Art

Public data networks, such as the World Wide Web, use standard communication protocols which enable computers connected to the network to process requests for data from users. These protocols allow document authors to link their content with any other content that exists on the network. For example, if when creating a web page an author mentions the company Sun Microsystems, the author may decide to link the text "Sun Microsystems" to the company's web site. This enables anyone reading the web page to access the Sun web site just by clicking on the linked text.

Processes and techniques for comparing two electronic documents and displaying the differences between them exist in the art. For example, Microsoft™'s Word™ 97 program contains a "track changes" feature that displays the differences between two documents highlighted in a particular way, such as using a red font.

Processes and techniques for finding and replacing text specified by a user exist in the art. This feature appears in just about every major word processing and text editing package. With this feature a user can enter one character string to be found in a document and another character string that will replace the original when it is found in the document.

Processes and techniques for encrypting data transmissions exist in the art. Public-private key encryption is one from of data encryption widely available. Public-private key cryptography is based on a mathematical process that generates two keys where one key cannot be determined from knowing the other. The private key is known only to the user. Typically it is a long series of characters stored on the user's computer. The public key is "published", that is, made available to anyone who wants it. When the user needs to send a secure transmission, the data is encrypted using his private key. When the transmission is received the recipient can decrypt the data using the corresponding public key.

The Problems

When a Webmaster or the author, owner or maintainer of an on-line document on a site receiving requests for the document (receiving site) changes the location of the document, hypertext links contained in documents on other sites (feeding or feeder sites) which point to that document, become no longer valid. This can cause a significant decrease in the number of people visiting a web page. It also leads to an excessive number of error messages to users and to a less than optimal user experience on the network.

SUMMARY OF THE INVENTION

The invention provides methods, apparatus, systems, and computer program products which allows web sites to easily update hypertext links in documents on feeder sites to point to new locations for a receiving site document when the document has been relocated. This process is called re-linking. Three embodiments of the invention are disclosed. In the first embodiment the feeder Webmaster must manually indicate if the broken link should be updated. In the second embodiment the feeder Webmaster gives prior permission to receiving site webmasters to automatically update links on feeding sites when a document is moved. In the third embodiment a trusted third party acts as an intermediary between the feeding and receiving sites. The third party has prior permission to automatically update feeder document links or URLs. Receiving sites send re-link information to the third party to initiate the update.

The foregoing and other features, aspects and advantages of the present invention will become more apparent from the following detailed description of the present invention when taken in conjunction with the accompanying drawings.

BRIEF DESCRIPTION OF THE DRAWINGS

The objects, features and advantages of the system of the present invention will be apparent from the following description, in which:

FIG. 3B is an exemplary layout of a re-linker database.

FIG. 11 is an exemplary screen display resulting from a re-link message that can be used with certain embodiments of the invention.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1A:
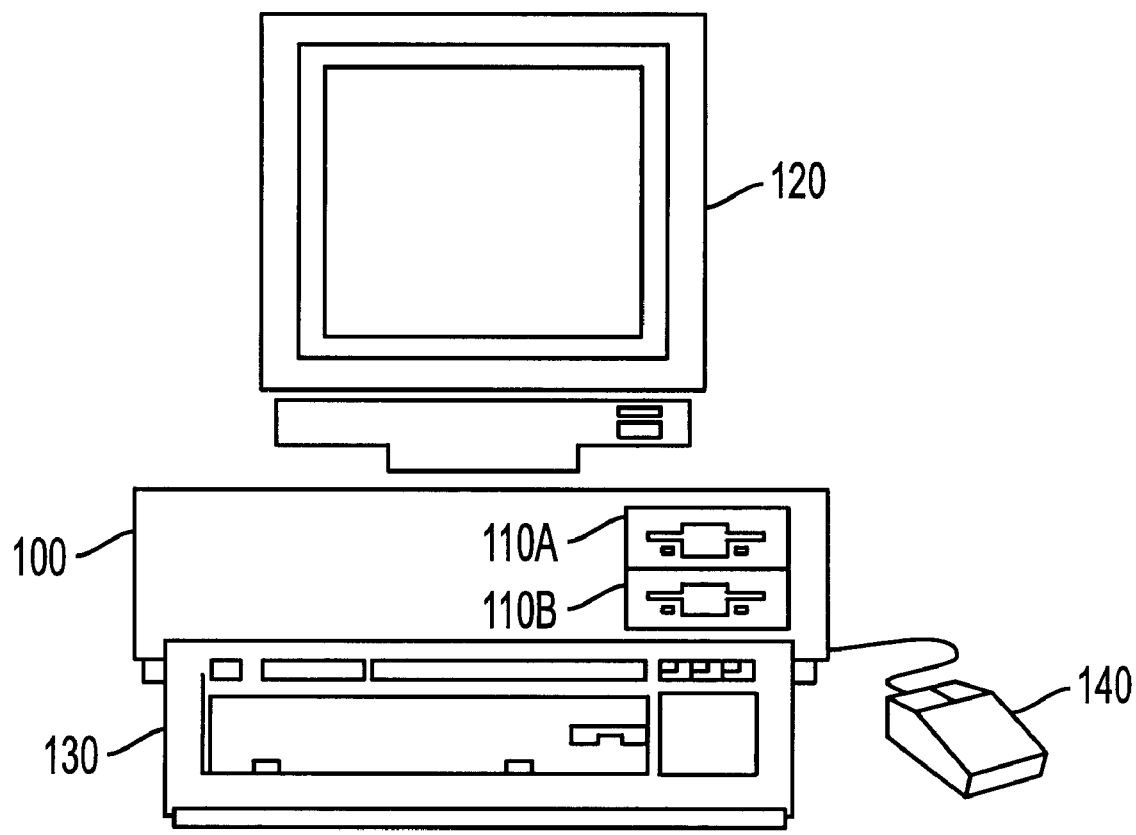
FIG. 1A is a view of an exemplary computing environment equipped with a keyboard, monitor, and mouse suitable for use as a user, server or trusted third party service in a network environment.

FIG. 1A illustrates a computer of a type suitable for carrying out the invention. Viewed externally in FIG. 1A, a computer system has a central processing unit 100 having disk drives 110A and 110B. Disk drive indications 110A and 110B are merely symbolic of a number of disk drives which might be accommodated by the computer system. Typically, these would include a floppy disk drive such as 110A, a hard disk drive (not shown externally) and a CD ROM drive indicated by slot 110B. The number and type of drives varies, typically, with different computer configurations. The computer has the display 120 upon which information is displayed. A keyboard 130 and a mouse 140 are typically also available as input devices. Preferably, the computer illustrated in FIG. 1A is a SPARC® workstation from Sun Microsystems, Inc.

Figure 1B:
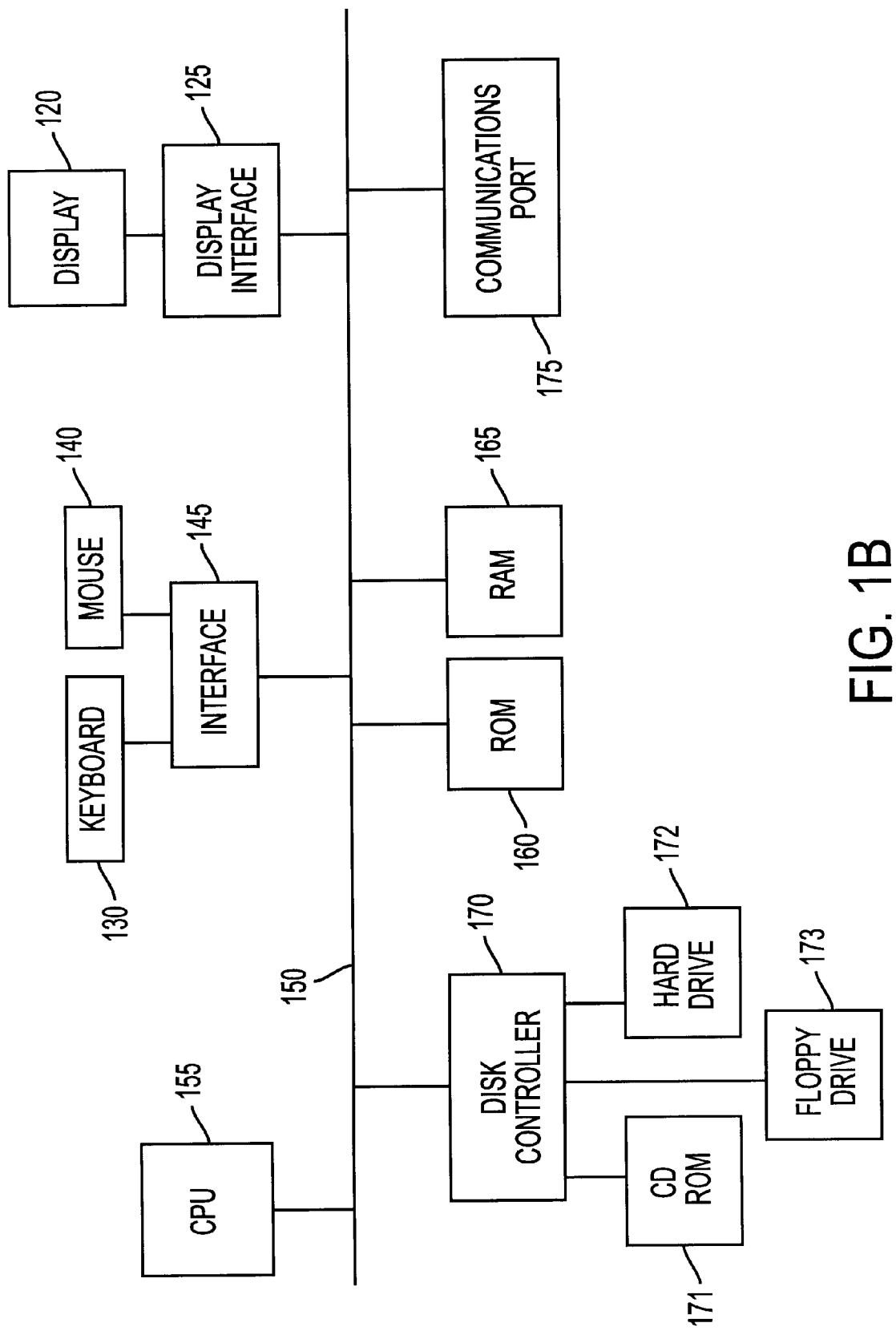
FIG. 1B is a block diagram of a computer architecture suitable for use in carrying out the invention.

FIG. 1B illustrates a block diagram of the internal hardware of the computer of FIG. 1A. A bus 150 serves as the main information highway interconnecting the other components of the computer. CPU 155 is the central processing unit of the system, performing calculations and logic operations required to execute programs. Read only memory (160) and random access memory (165) constitute the main memory of the computer. Disk controller 170 interfaces one or more disk drives to the system bus 150. These disk drives may be floppy disk drives, such as 173, internal or external hard drives, such as 172, or CD ROM or DVD (Digital Video Disks) drives such as 171. A display interface 125 interfaces a display 120 and permits information from the bus to be viewed on the display. Communications with external devices can occur over communications port 175.

Figure 1C:
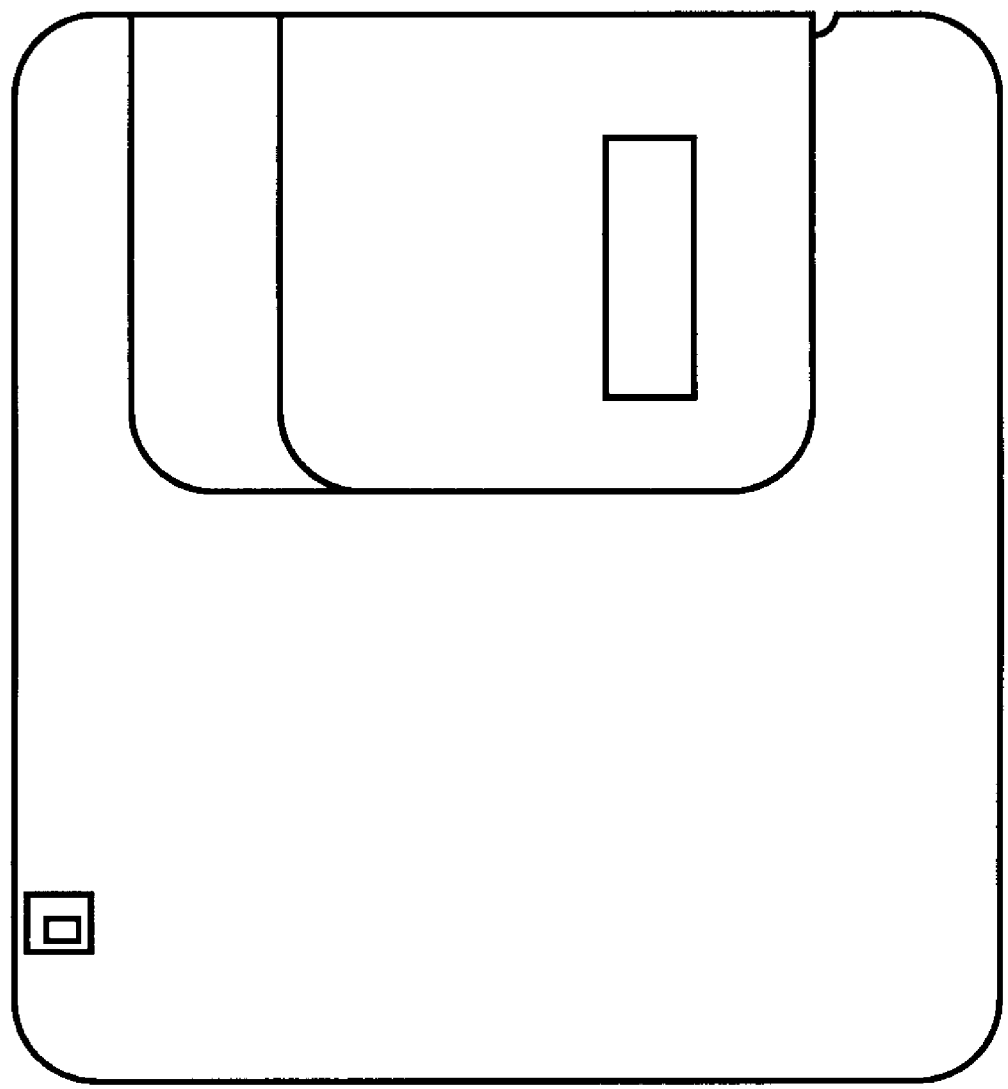
FIG. 1C is a diagram of an exemplary digital storage medium.

FIG. 1C illustrates an exemplary memory medium which can be used with drives such as 173 in FIG. 1B or 110A in FIG. 1A. Typically, memory media such as a floppy disk, or a CD ROM, or a Digital Video Disk will contain the program information for controlling the computer to enable the computer to perform its functions in accordance with the invention.

Figure 1D:
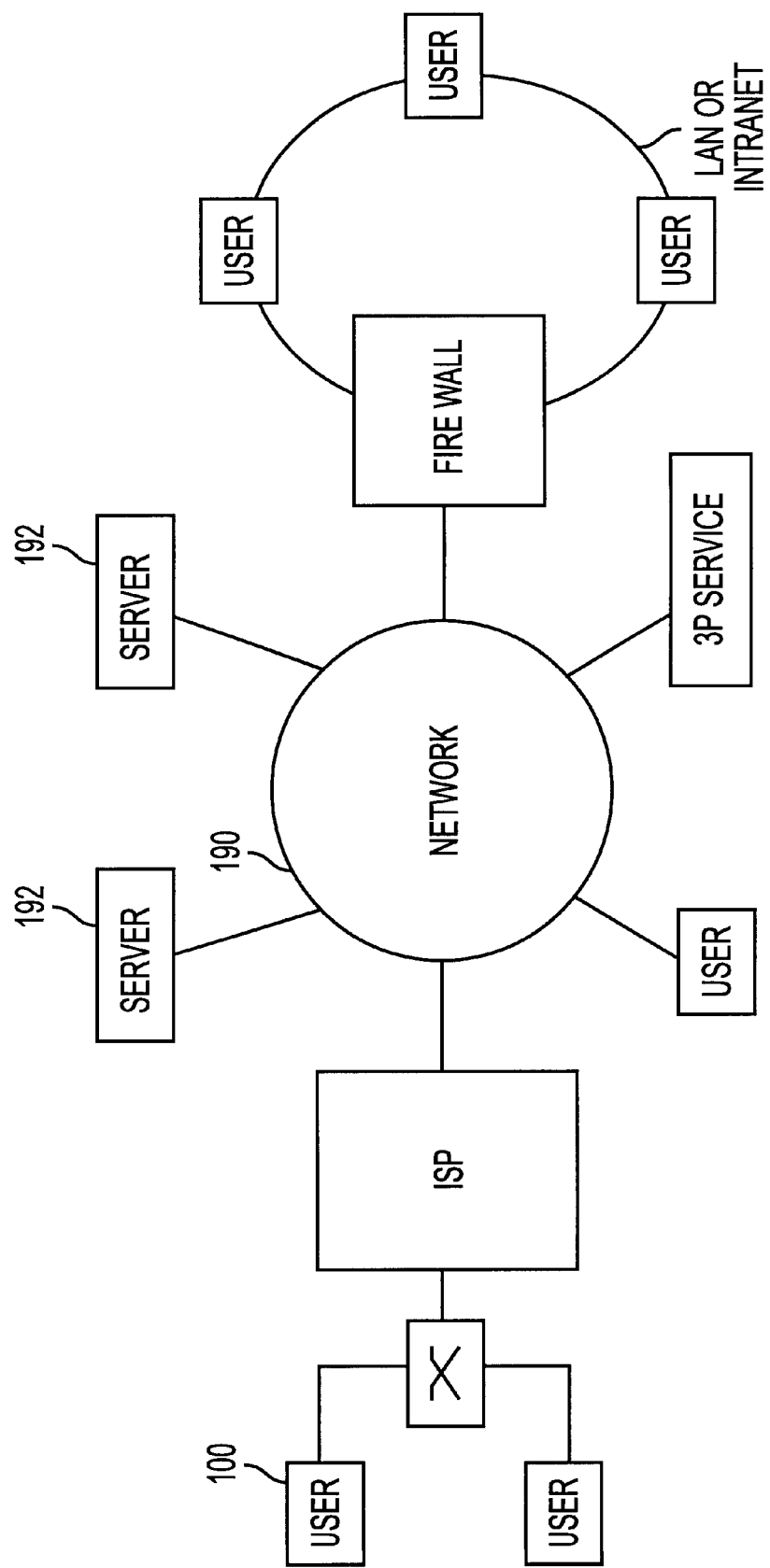
FIG. 1D is a block diagram of an exemplary computer network on which the invention may operate.

FIG. 1D is a block diagram of a network architecture suitable for carrying data and programs in accordance with some aspects of the invention. A network 190 serves to connect a user computer 100 with either a server 192 for the download of program and data information. Users may connect to the network either directly or via a network service provider (such as Internet Service Provider, ISP), proxy server (not shown) or through a firewall network interface to a local area network (LAN).

Figure 1E:
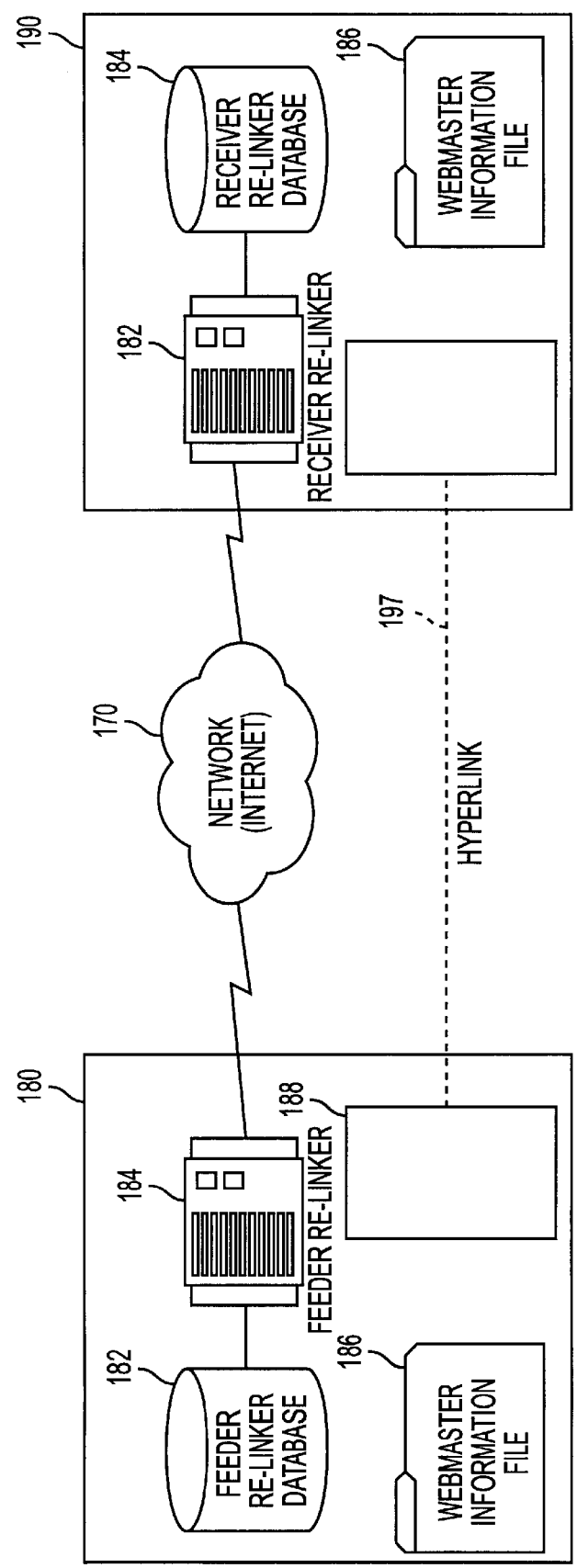
FIG. 1E is a diagram of an information systems architecture suitable for carrying out the invention.

FIG. 1E is a diagram showing the information systems architecture components on which the invention is intended to operate. A feeding site (180) and a receiving site (190) are computers connected to a network such as the Internet (170) or an Intranet. The feeding site contains a document (188) that provides an information link (197) to a document on the receiving site (196). The feeding and receiving site computers will each run a re-linking process (184). Each will preferably contain a webmaster information file (186). A preferred embodiment of the invention uses a re-linker database (182). One should note that each server in a network will normally function as both a feeding and a receiving site.

Figure 2:
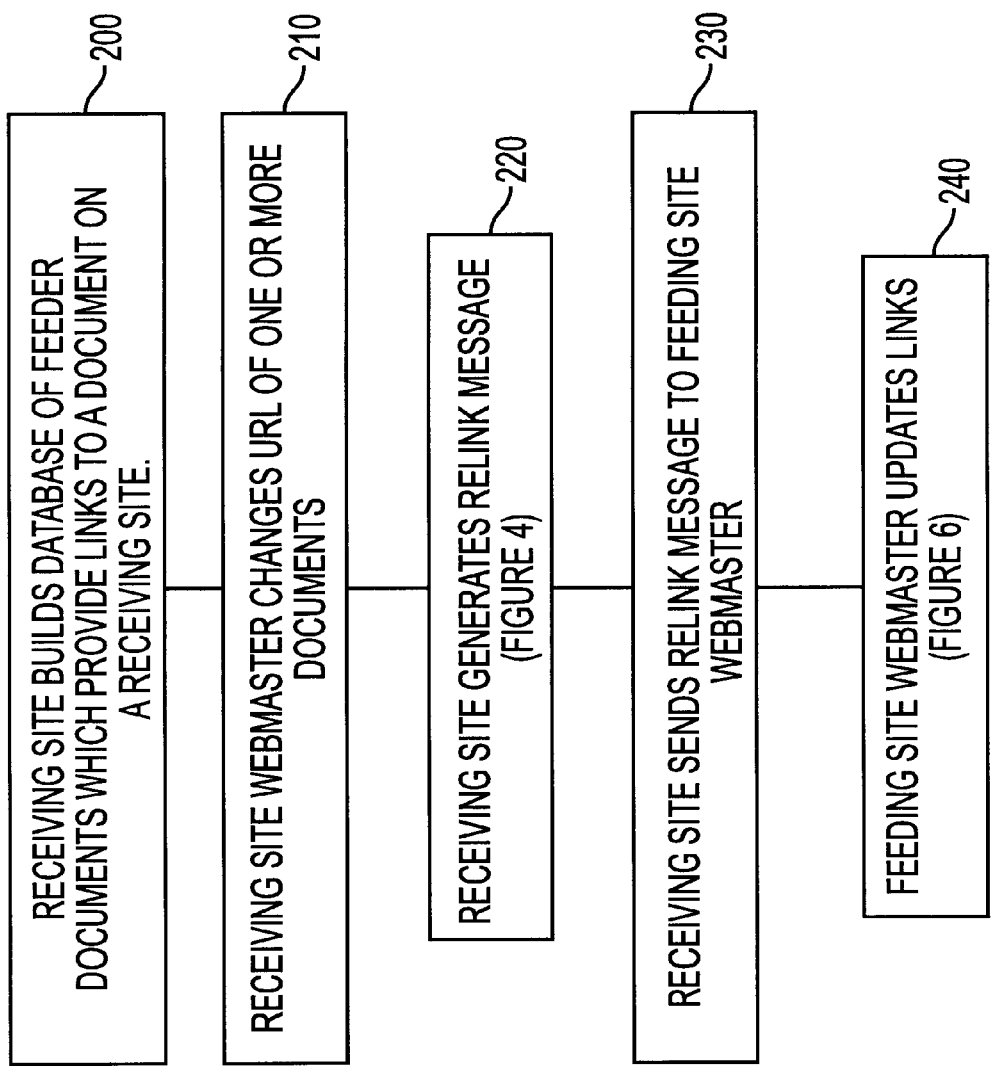
FIG. 2 is a flow chart of an exemplary process used in accordance with a first embodiment of the invention.

FIG. 2 is a high level flow chart of processes used in accordance with one embodiment of the invention. As users request documents on a receiving site (190), the receiving site re-linker 184 builds a database (182) of feeder documents (188). A feeder document is one which contains a hypertext link to a document on another server (receiving site). The process of building the database of feeder documents is described in conjunction with FIG. 3. When the receiver webmaster changes the uniform resource locator (URL) of a document(s) (210) the receiver re-linker generates an re-link message which is sent to all sites containing feeder pages (220) contained in the database. The process of generating re-link messages is described in conjunction with FIG. 4. The receiving site then sends the re-link message to all appropriate feeding site webmasters informing them of the change (230). The process of handling re-link messages is described in conjunction with FIG. 5. Upon receiving the re-link message the feeder webmaster updates the appropriate links on the feeding site by either changing the link URL or removing the link (240). The update process is described in conjunction with FIG. 9.

Figure 3A:
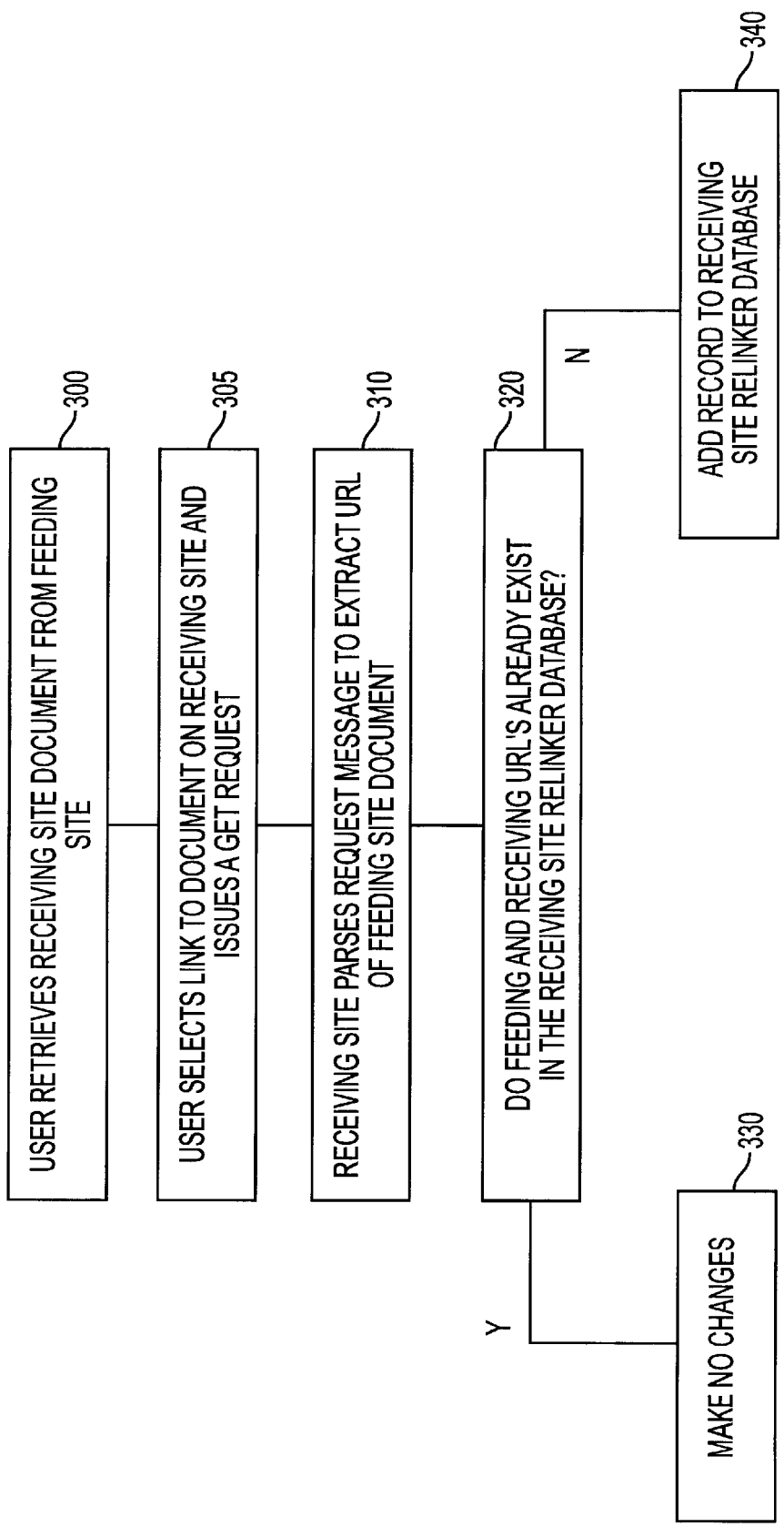
FIG. 3A is a flow chart of an exemplary process used to store information about the source of document requests to the receiving site in a re-linker database.

FIG. 3A is an exemplary flow chart describing the processes required to determine the URL of the feeder document and add it to the receiving site database (182). When a user (100) requests a document from a receiving site (300) by clicking on a hypertext link (197), the user's client software sends a request message to the receiving site's server (190). In one embodiment of the invention, this message is sent using the hypertext transfer protocol (HTTP) GET request. The HTTP GET request, in this case, contains a referrer field that includes the URL of the document which contains the link to the receiving site. A link is activated by clicking on a link anchor. A link anchor is a document element, such as text or images, which can be selected (e.g. by double clicking) to activate a hyperlink. The link anchor URL contains the name of the receiving site and the document name. For example, www.sun.com/tech.html indicates a site with the name www.sun.com and a document name of tech.html. Using this information the receiving site parses the URL in the referrer field from the URL of the requested page (310). The re-linking software checks the receiving site database to see if the feeder URL and corresponding receiver URL data already exists (320). If the data is already in the database the receiver re-linker does nothing (330). If the data is not in the database the receiver re-linker appends it (340). In one embodiment of the invention the receiver re-linker database can be a simple flat file with two columns, one for the feeder URL and one for the receiver URL as shown in FIG. 3B. However, the database can contain additional information.

Figure 4:
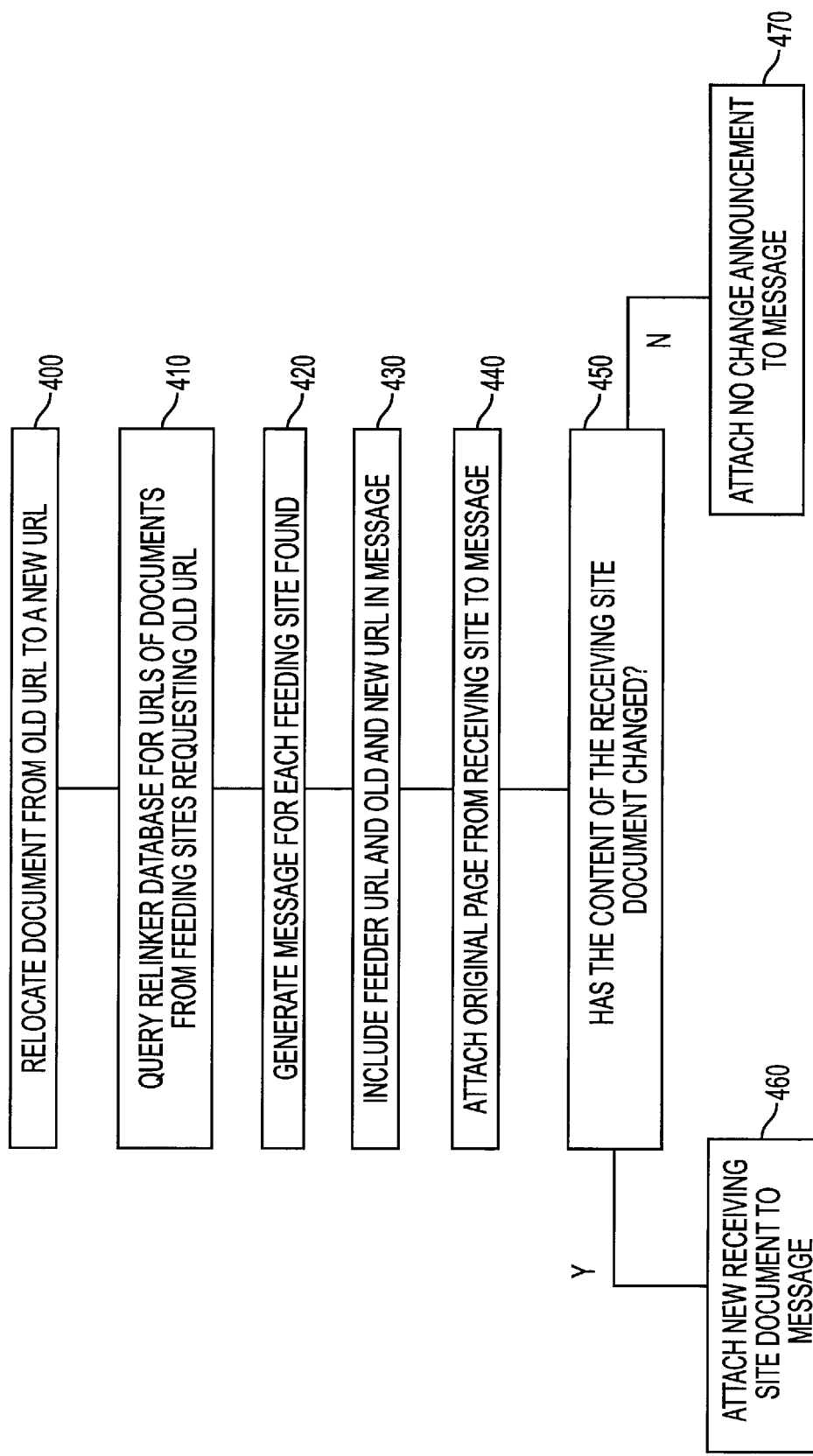
FIG. 4 is a flow chart of an exemplary process used to generate a re-link message.

FIG. 4 is an exemplary flow chart describing the processes required to generate a re-link message. When a receiver webmaster moves a document (400), the old URL is used to query the receiving site database (410) to obtain a list of URL's of documents (feeder URLs) which point to the old URL. A new message or software action is generated for each feeder URL found (420). This message will have a standard preamble informing the recipient that a link has changed. The re-link message addressing process is described in conjunction with FIG. 6. The receiving site attaches the URL of the feeder document together with the old and new URL's to the message after the standard preamble (430). The receiving site then attaches a copy of the document in the form it was prior to the move to the re-link message (440). The message then indicates whether the original document's content has changed (450). If no content changes were made the receiving attaches a "no changes" announcement to the re-link message (470). If content has changed concurrently with the move then the receiving site attaches the new document to the re-link message (460) as well. The re-link message is illustrated and discussed more in conjunction with FIG. 11.

Figure 5:
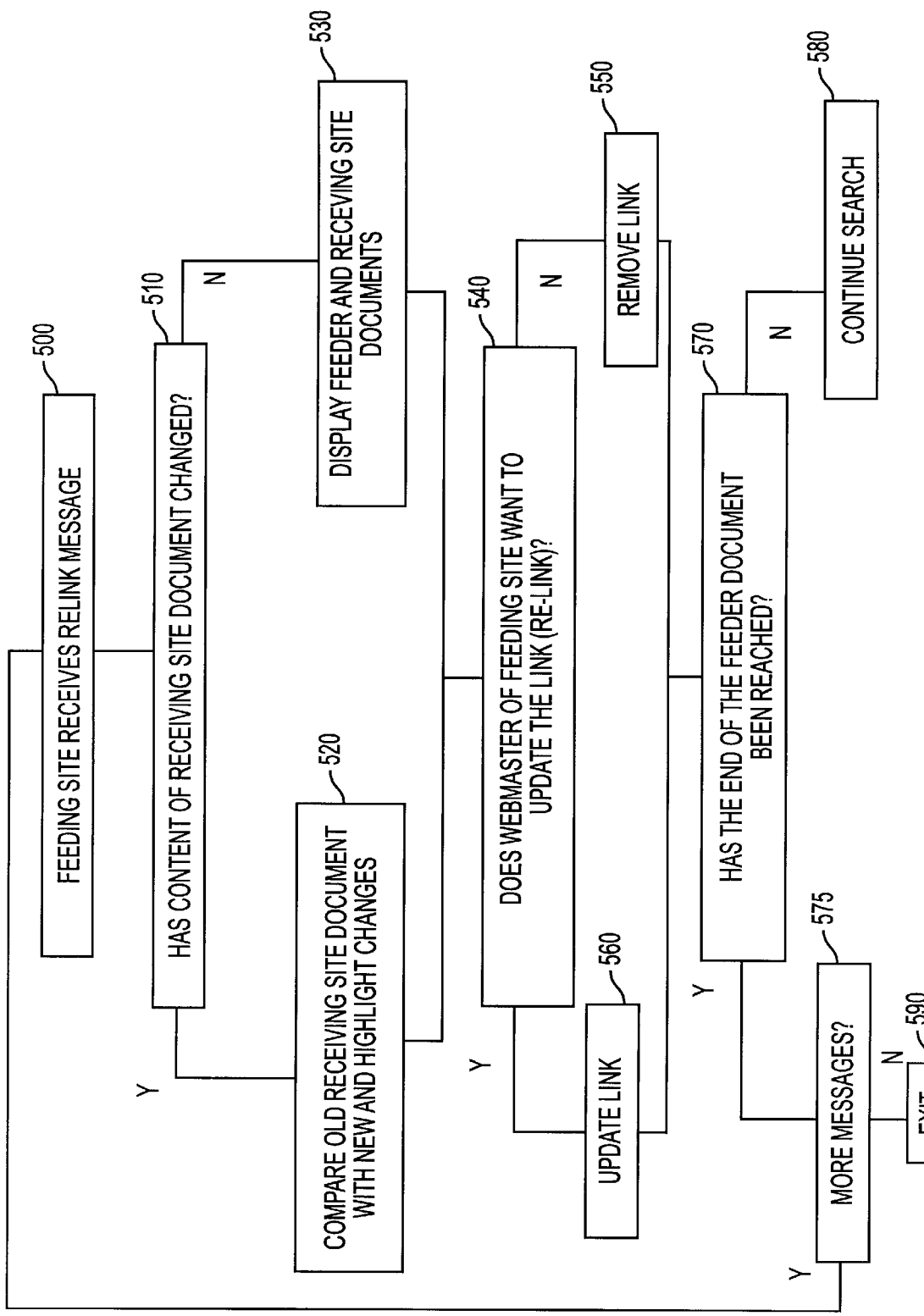
FIG. 5 is a flow chart of an exemplary process for receiving and processing a re-link message in accordance with one embodiment of the invention.

FIG. 5 is an exemplary flow chart describing the steps required for the feeding site to receive and process a re-link message. The feeding site receives a re-link message (500) periodically or as they are received and presents them for consideration by the webmaster. The feeding site determines from the message if the content of the relocated document has changed (510). This can be accomplished by searching the re-link message for a standard "no changes" announcement. If the document has changed the feeder re-linker will display the old document and the new document from the receiving site and the feeder document containing the link(s) (520). The changes between the old and the new documents will be optionally highlighted using document comparison techniques known in the art. The feeder document will be displayed with the linked area preferably highlighted and positioned approximately ⅔ of the way down the portion of the display containing that document. See FIG. 11 for an exemplary representation of the comparison screen display. If the receiver document has not changed the feeding site will display the moved document and the feeder document (530). As before the feeder document will be displayed with the linked area preferably highlighted approximately ⅔ of the way down the feeder portion of the display. The webmaster of the feeding site will then determine whether to update the link (re-link) to point to the new location of the document (540). If the feeder webmaster decides not to re-link then the link will be removed from the feeder document (550). If the webmaster of the feeding site decides to re-link, the old URL in the feeder document will be replaced with the new receiver URL using search and replace technology known in the art (560). The feeder re-linker determines if the end of the document has been reached (570). If the end has not been reached the feeder re-linker will continue searching the feeder document for additional links to the old URL (580). If the end of the document has been reached then the feeder re-linker will conclude processing the current re-link message (590) unless there are more messages to process.

Figure 6:
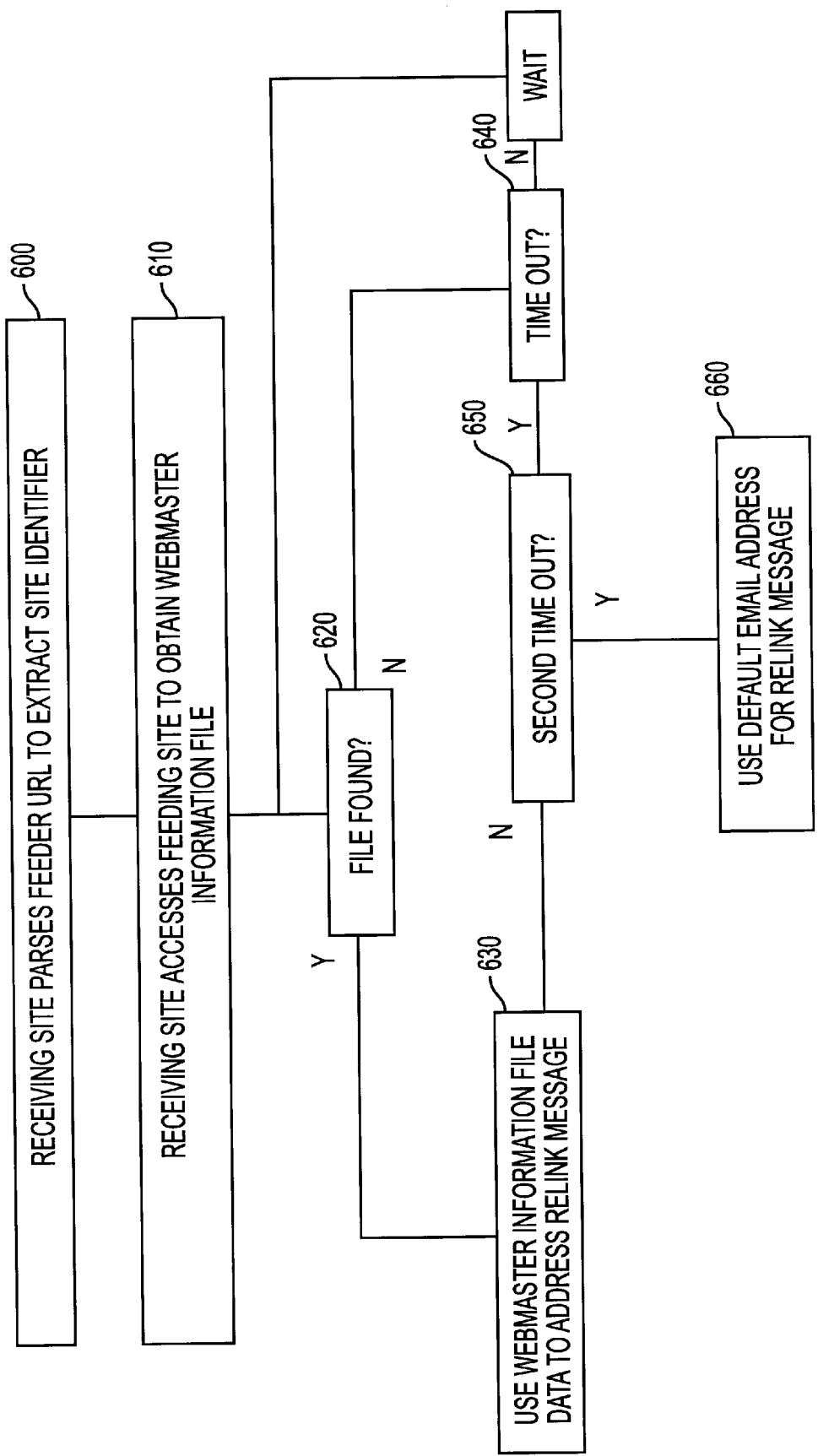
FIG. 6 is a flow chart of an exemplary process used for addressing re-link messages.

FIG. 6 is an exemplary flow chart describing the processes required for the receiving site to address re-link messages. The receiving site parses the feeder URL to retrieve the root URL of the feeding site (600). For example, www.sun.com/tech/java.html would be parsed to retrieve www.sun.com. The receiving site re-linker searches the root directory of the feeding site for a webmaster information file (610). This file will contain an E-mail address for sending re-link messages. The file should preferably have a standard name and location on a server. For example, the file could be called webmaster_info.html and be located at top level directory of each site. The webmaster information file for the Sun site in this example would be found at www.sun.com/webmaster_info.html. The receiving site determines if the webmaster information file was found (620). If the file was found then the E-mail address contained in the file will be used to address the re-link message (630). If the receiving site times out before receiving information from the webmaster information file (640), it will attempt to find the webmaster information file one more time (610). If a receiving site times out a second time (650) then the re-link message will use the default E-mail address (660). If the receiver re-linker receives a message other than one from the webmaster information file, then it will use the default E-mail address (660). An example of a default E-mail address is webmaster@[domain name]. For example, the default E-mail address for www.sun.com would be webmaster@sun.com.

Figure 7:
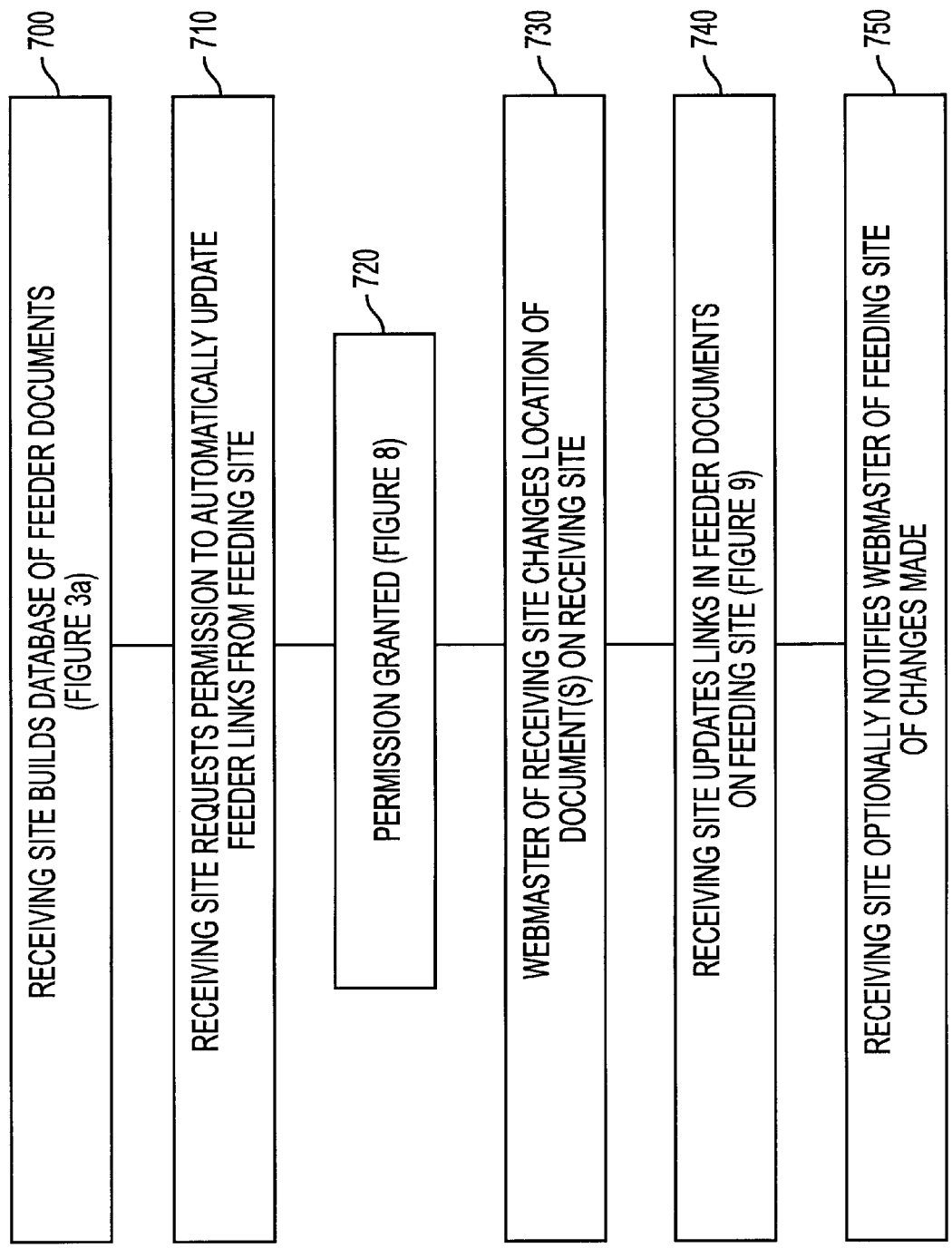
FIG. 7 is a flow chart of an exemplary process used in accordance with a second embodiment of the invention.

FIG. 7 is a high level flow chart of processes used in accordance with a second embodiment of the invention. As users request documents on the receiving site, the receiving site builds a database (182) of feeder document URLs (700). The process of building the receiver re-linker database was described in detail in conjunction with FIG. 3A. As user requests are processed the receiver re-linker requests permission to update the feeder document link when necessary (710). The granting of update permission (770) is described in detail in conjunction with FIG. 8. When a webmaster changes the uniform resource locator (URL) of a document (s) (730) the receiver re-linker updates links in the applicable feeder document(s) (740). The update process is described in conjunction with FIG. 9. The receiver re-linker may optionally send the feeder webmaster an E-mail message informing him/her of the update (750).

Figure 8A:
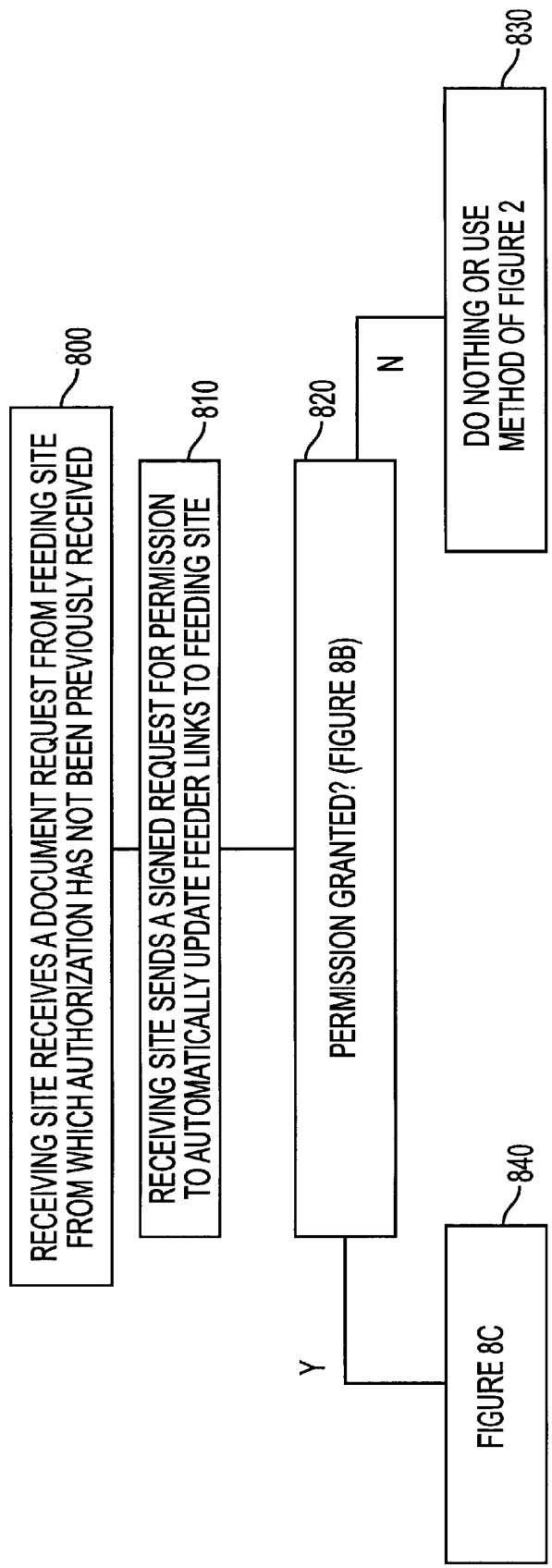
FIG. 8A is a flow chart of an exemplary process used to grant permission for a receiving site to automatically update links in a feeder site's documents.

FIG. 8A is an exemplary flow chart describing the processes required for the webmaster of a feeding site to grant permission for a receiving site to automatically update links in feeding site's documents. When the receiving site processes a document request from a feeding site not already in the re-linker database 182 (800) the receiving site sends an E-mail message to the feeding site asking permission to automatically update feeding site documents or at least those pointing to the receiving site (810). The receiving site addresses the message as described in FIG. 4. However, the webmaster of the feeding site may use the webmaster information file to set an option to have re-link messages automatically handled. Upon receiving the message, the webmaster or an automatic process must decide whether to grant update permission to the receiver (820). The feeding site may include a feature that allows the feeder webmaster to automatically grant re-link permission to all receivers. If the Webmaster decides not to grant permission no action is taken.

Figure 8B:
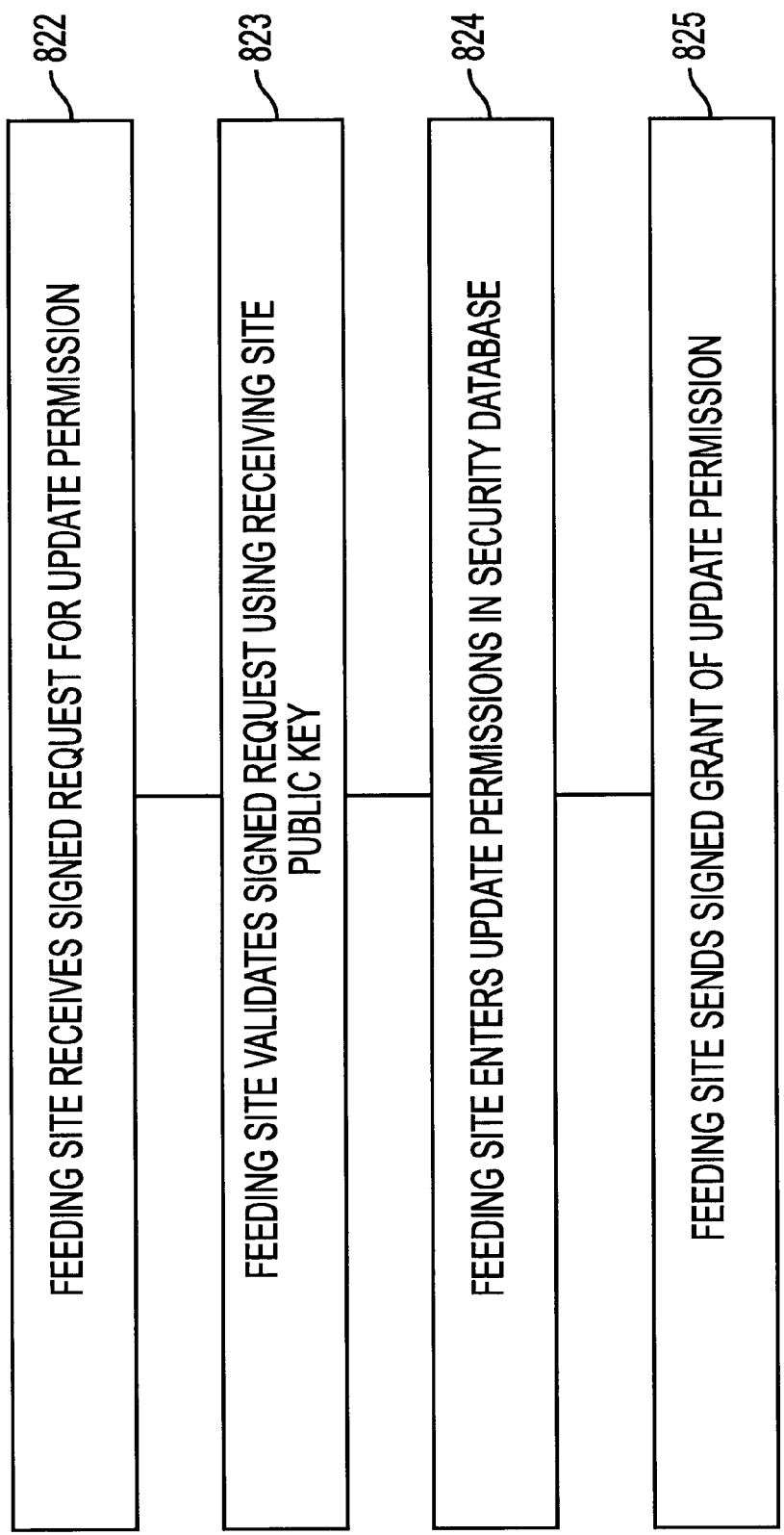
FIG. 8B is a flow chart of exemplary site action when a grant of update authority is received.

FIG. 8B is a flow chart of an exemplary process used when permission is granted (820-Y) for a receiving site to automatically update links in the feeder site's documents. When the receiving site receives a document request from a feeding site, if authorization has not already been obtained from the feeding site for automatic update of the feeding sites links, the receiving site sends a signed request for permission to automatically update the feeding site links to the feeding site (822). Digital signatures using public-private key encryption are well known in the art. The feeding site validates the signed request using the receiving sites public key (823). If the signed request is authentic, the feeding site enters update permissions in the security database for the server to permit the receiving site to make changes in the files on the server. Preferably, the security system in use is one which permits data element security to be specified on a per user basis. Once the security entries have been made, the feeding site optionally sends a signed grant of update permission (825).

Figure 8C:
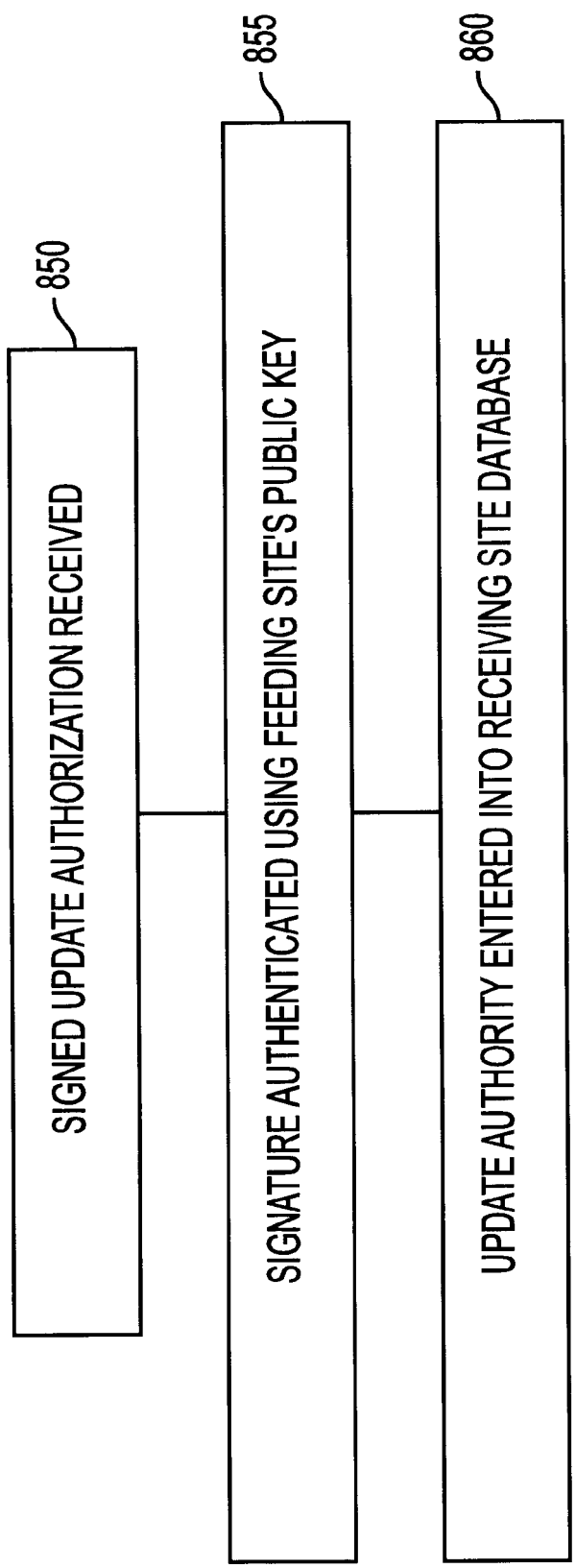
FIG. 8C is a flow chart of an exemplary process for indicating that a receiving site has authorization to update link entries on a feeding site.

FIG. 8C is a flow chart of an exemplary process for indicating that a receiving site has authorization to update link entries on a feeding site. When the receiving site receives the signed update authorization message (850), the signature is authenticated using the feeding site's public key (855). The receiving site may then record the update authority by making an entry into the receiving site feeder database.

Figure 9:
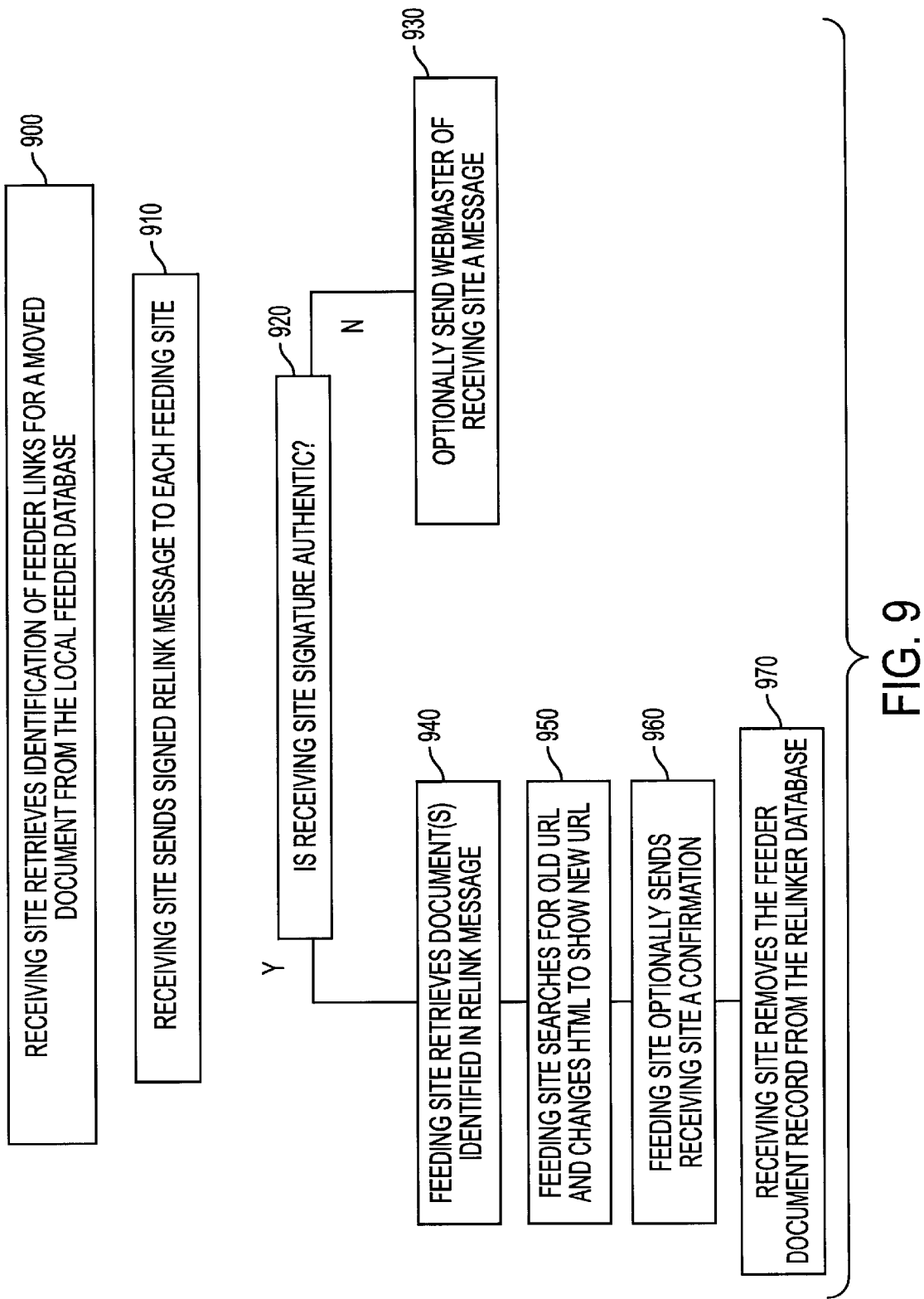
FIG. 9 is a flow chart of an exemplary process used to update links in feeder pages at a feeding site.

FIG. 9 is an exemplary flow chart which describes the processes required at a receiving site to update links in feeder pages at a feeding site. When the URL of a document on the receiving site changes, the receiving site retrieves identification of feeder links for a moved document from the local feeder database using the old URL as a query (900). The database returns a list of feeder documents that require update optionally separating those which the receiving re-linker has permission to update. The receiving site sends a signed re-link message to the feeding site (910). The re-link message includes the URL of the feeder document(s) requiring update, the old URL of the receiver document, the new URL of the receiver document. When the feeding site receives the re-link message, it checks to make sure that the signature is authentic. It then checks the re-linker database to ensure that the receiver has permission to make the update (920). If the feeder re-linker cannot authenticate the re-link message it either sends a notification message to the receiver webmaster (930) or does nothing. If the re-link message is authenticated the re-linker at the feeding site retrieves the applicable feeder document (940). The re-linker then replaces the old URL with the new URL (950) in the feeder document. The feeding site optionally sends a confirmation message to the receiving site (960) stating that the document has been re-linked. Upon receiving the confirmation message the receiving site re-linker removes the feeder document record from the re-linker database (970).

Figure 10:
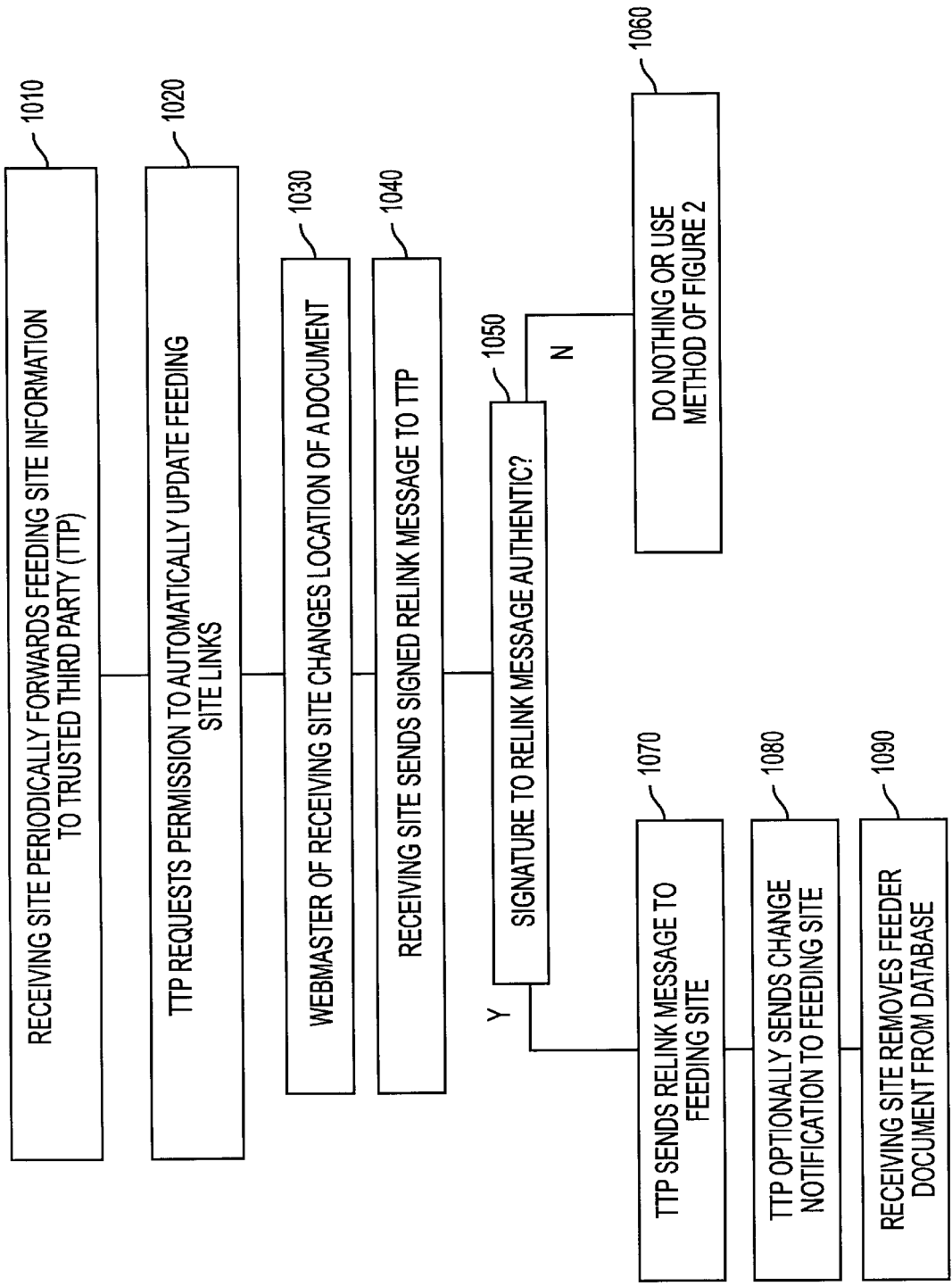
FIG. 10 is a flow chart of an exemplary process used in accordance with a third embodiment of the invention.

FIG. 10 is a flow chart of an exemplary process used in accordance with a third embodiment of the invention. As users request documents on the receiving site the receiving site forwards information about the feeding document to a trusted third party (TTP) (1010). The TTP requests permission of the feeding site to update feeding site documents on behalf of receiving sites (1020). In the requesting and obtaining of update permissions, the TTP takes on the role of a receiving site as described in the second embodiment, but for a plurality of servers. The processes involved in granting update permission were described in conjunction with FIG. 8. When the webmaster of a receiving site changes the URL of a document(s) (1030) the receiver re-linker sends a signed re-link message (1040) to the TTP. The process of generating such a re-link message is described in conjunction with FIG. 4. If the signature to the re-link message can be verified, the TTP will send a re-link message to the feeding site re-linker (1070) and change the hypertext of the feeding link. The processes involved in updating feeder pages is described in conjunction with FIG. 9. If the signature is not authentic, there is no response. When the TTP receives a confirmation message (960) it optionally sends a change notification to the feeding site (1080) and optionally forwards the confirmation to the receiving site. The receiving site then deletes the feeder document records from the re-linker database (1090).

FIG. 11 is an exemplary representation of a screen display that can be used in certain embodiments of the invention. In the upper left portion of the screen the old document is displayed along with its URL (1110). In the upper right portion of the screen the new document is displayed along with its URL (1120). Any changes made to the old document are highlighted using techniques known in the art. The windows in which the old and new documents are displayed may be expanded to fill the screen in known fashion. The feeder page is displayed in the middle of the screen (1130). The feeder document anchor (1140) is scrolled approximately ⅔ down the feeder document portion of the screen. The bottom of the screen displays a message indicating the precise nature of the change (1150). The bottom of the screen also contains buttons for re-linking (1160) or for removing the link (1170). This provides all the information needed to make an informed decision whether to re-link a document or not.

In this way, information links in an information space which become broken or non-functioning as a result of relocating of documents either within a web site or across web sites can be automatically or semi-automatically healed with a high degree of assurance that the resulting relinking will be appropriate. In this way, the problems of the prior art are overcome and the user has a more desirable interaction with the network.

Although the present invention has been described and illustrated in detail, it is clearly understood that the same is by way of illustration and example only and is not to be taken by way of limitation, the spirit and scope of the present invention being limited only by the terms of the appended claims and their equivalents.

What is claimed is:

1. An apparatus for updating linking information of a link from a first document to a second document, wherein:
   the first document is stored on a first computer;
   the second document is stored on a second computer;
   the second document has an associated network address;
   the first document comprises linking information including the associated network address of the second document;
   a communication interface is arranged between the first computer and the second computer;
   the second computer is configured to send a message over the communication interface to the first computer when the network address associated with the second document has changed;

the message comprises an executable option that replaces the linking information comprised in the first document, wherein the replacement of the linking information updates the associated network address of the second document; and the message includes the entire content of the second document.

2. A system for updating linking information of a link from a first document to a second document, wherein:

the first document is stored on a first computer;

the second document is stored on a second computer;

the second document has an associated network address;

the first document comprises linking information including the associated network address of the second document;

a communication interface is arranged between the first computer and the second computer;

the second computer is configured to send a message over the communication interface to the first computer when the network address associated with the second document has changed;

the message comprises an executable option that replaces the linking information comprised in the first document, wherein the replacement of the linking information updates the associated network address of the second document; and the message includes the entire content of the second document.

3. A method of updating linking information of a link from a first document to a second document, wherein:

the first document is stored on a first computer;

the second document is stored on a second computer;

the second document has an associated network address;

the first document comprises linking information including the associated network address of the second document;

a communication interface is arranged between the first computer and the second computer; and the method comprises the following steps:

1) the second computer sends a message over the communication interface to the first computer when the network address associated with the second document has changed, wherein the message includes the entire content of the second document;

2) the first computer optionally executes an executable option comprised in the message that replaces the linking information comprised in the first document; and 3) if the first computer executes the executable option, then the associated network address of the second document is updated in the first document.

4. A computer readable medium bearing instructions for updating linking information of a link from a first document to a second document, wherein:

the first document is stored on a first computer;

the second document is stored on a second computer;

the second document has an associated network address;

the first document comprises linking information including the associated network address of the second document;

a communication interface is arranged between the first computer and the second computer;

said instructions being arranged to cause one or more processors upon execution thereof to perform the steps of:

1) the second computer sends a message over the communication interface to the first computer when the network address associated with the second document has changed, wherein the message includes the entire content of the second document;

2) the first computer optionally executes an executable option comprised in the message that replaces the linking information comprised in the first document; and 3) if the first computer executes the executable option, then the associated network address of the second document is updated in the first document.

* * * * *